United States Patent [19]

Bartenbach

[11] Patent Number: 4,517,960

[45] Date of Patent: May 21, 1985

[54] PROTECTION DEVICE AGAINST SOLAR LIGHT

[76] Inventor: Christian Bartenbach, Rinnerstrasse 39, A-6020 Innsbruck-Aldrans, Austria

[21] Appl. No.: 504,058

[22] PCT Filed: Sep. 20, 1982

[86] PCT No.: PCT/DE82/00204

§ 371 Date: May 20, 1983

§ 102(e) Date: May 20, 1983

[87] PCT Pub. No.: WO83/01122

PCT Pub. Date: Mar. 31, 1983

[30] Foreign Application Priority Data

Sep. 25, 1981 [DE] Fed. Rep. of Germany ....... 3138262
Jul. 16, 1982 [DE] Fed. Rep. of Germany ....... 3226709

[51] Int. Cl.³ .......................... F24J 3/02; G02B 27/00
[52] U.S. Cl. ...................... 126/440; 350/263
[58] Field of Search ............. 126/419, 440, 432, 450; 350/259, 260, 261, 262, 263, 264, 265; 160/236, 130, 136, 166 R

[56] References Cited

U.S. PATENT DOCUMENTS

| | | | |
|---|---|---|---|
| 3,185,034 | 5/1965 | Youngblood, Jr. | 350/263 X |
| 3,438,699 | 4/1969 | Seeger | 350/263 |
| 3,471,221 | 10/1969 | Seeger | 350/263 |
| 4,382,434 | 5/1983 | Meckler | 126/440 X |

FOREIGN PATENT DOCUMENTS

| | | |
|---|---|---|
| 515650 | 7/1976 | Australia . |
| 1906990 | 3/1970 | Fed. Rep. of Germany . |
| 2732592 | 1/1978 | Fed. Rep. of Germany . |
| 2185743 | 1/1974 | France . |
| 8017364 | 2/1981 | France . |
| 22325 | of 1904 | United Kingdom ............... 350/263 |

*Primary Examiner*—Randall L. Green
*Attorney, Agent, or Firm*—Hill, Van Santen, Steadman & Simpson

[57] ABSTRACT

Known protection devices against solar light have orientable slats of translucent material with, on the inside, a plurality of conical prisms. With such an arrangement, the closure field obtained is more or less circular and, as a consequence, the daylight penetration is unfavorable while it is necessary to provide for an additional orientation during the day. The device according to the invention has, compared to known devices, better transparency characteristics without requiring an adjustment to the orientation during the day and with little adjustment throughout the year. According to the invention, the slats orientable along their horizontal axes are of a simple construction, and are provided on the inner surfaces with prismatic rods parallel to the longitudinal axes and having on the outer surface a flat base face. The surfaces on the sides of the right angle of the prismatic rods are free of reflecting layers and form an angle of 90°.

5 Claims, 5 Drawing Figures

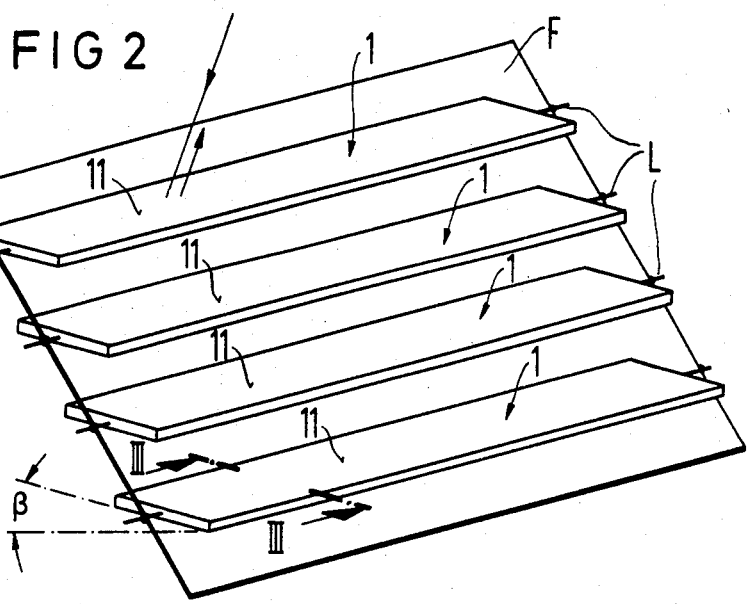
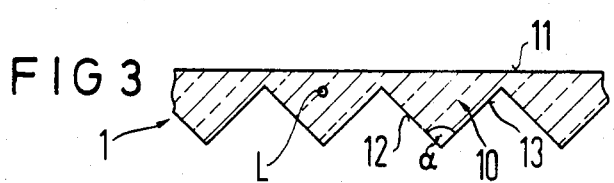
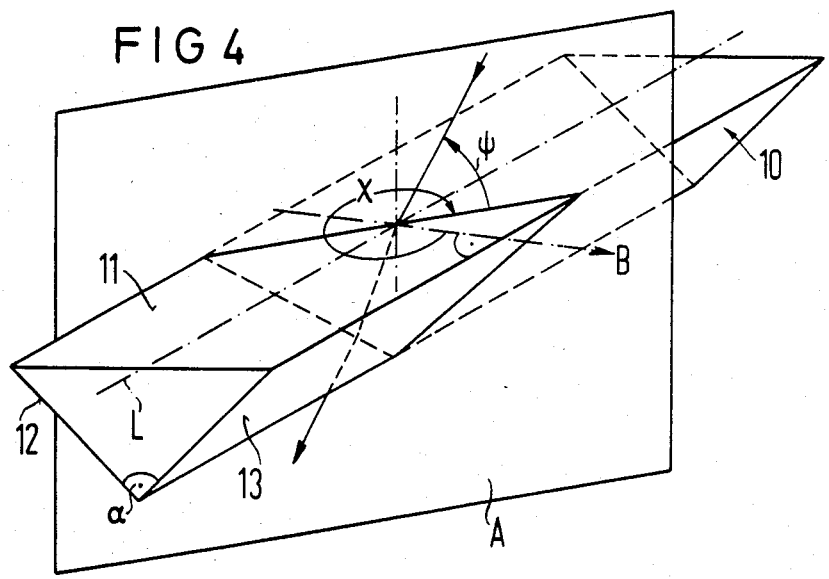

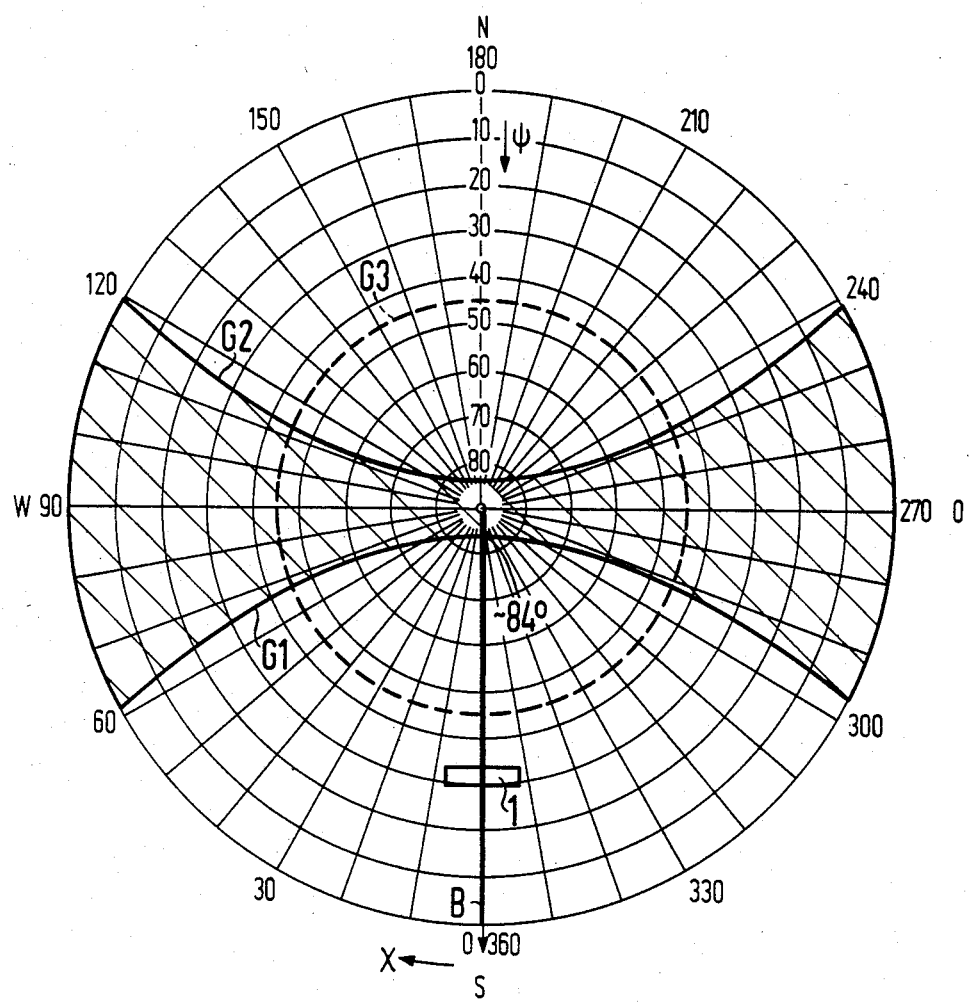

PROTECTION DEVICE AGAINST SOLAR LIGHT

BACKGROUND OF THE INVENTION

The present invention relates to a solar protection device, i.e. a device for providing protection against sunlight comprising a plurality of slats made of light-permeable material which on one side have a flat base surface and on the other side have a prismatic structure, and which are arranged one beside another in a window opening so as to be rotatable about parallel longitudinal axes.

An efficient solar protection device must take into account the fact that the angle of incidence of sunlight changes over a very wide range in dependence upon the time of day and the time of year. In known solar protection devices which are permanently installed, this range can be covered only by simultaneously screening off the desired daylight. In the interest of a better use of the daylight, it has been proposed in a solar protection device disclosed in German Patent Specification No. 16 83 284 incorporated herein by reference, that the inclination of the slats should be changed during the day in dependence upon the height of the sun. In the device described in this Specification, the slats on their inner side comprise a plurality of individual prism (triple reflectors) which results in an essentially circular screening zone with a critical angle of about 45°. However, this does not permit a complete screening of the sun's rays during the morning and afternoon.

In a solar protection device described in German Patent Specification No. 19 06 990, incorporated herein by reference the slats are, in contrast, arranged so as to be rotatable about vertical axes and to follow the particular location of the sun during the day by means of a motor drive. In this case, the individual slats are permanently inclined to the horizontal at an angle corresponding approximately to the particular degree of latitude whereby, at least at noon, complete screening from the sun can be achieved, regardless of the time of year.

On the other hand, with this arrangement, it must be accepted that the sun's rays will enter during the morning and evening hours around the summer and winter solstices. A greater disadvantage, however, is the elaborate mechanism and controls required to adjust the individual slats during the day. Finally the approximately circular screening zone means that a large proportion of the high-angle light will be reflected outwards by the slats and cannot enter the room.

SUMMARY OF THE INVENTION

It is, therefore, an object of the present invention to provide a solar protection device having improved lighttransmittance, together with a more effective screening of the sunlight and a simpler construction, than such devices previously proposed.

According to the invention, there is provided a solar protection device comprising a plurality of slats made of light-permeable material and having a flat base surface on one side and a prismatic structure on the other side, said slats being arranged in side-by-side relationship in a window opening so as to be rotatable about respective parallel longitudinal axes, the prismatic structure of said other side of the slats comprising at least one non-reflective prismatic rod, the longitudinal axis of which runs parallel to the longitudinal axis of the slat and whose said faces encloses between them at their outer ends an apical angle of 90°. Preferably each slat consists of a large number of prismatic strips, the adjacent side faces of which abut against one another without gaps.

The device of the invention operates independently of the inclination and alignment of the window surface, and is thus of particular use for installation in the frames of roof windows. In this case, it is expedient to orientate the axes of the slats at right angles to the north-south direction.

BRIEF DESCRIPTION OF THE DRAWINGS

The invention will now be further described with reference to the drawings, in which:

FIG. 2 is a schematic perspective view of a solar protection device in accordance with the invention;

FIG. 3 is a cross-section through a slat taken along the line III—III of FIG. 2;

FIG. 4 is a diagram illustrating the application of a coordinate system to a prismatic rod of a slat; and FIG. 5 is the screening diagram of a slat.

DESCRIPTION OF THE PREFERRED EMBODIMENTS

Figure 1:
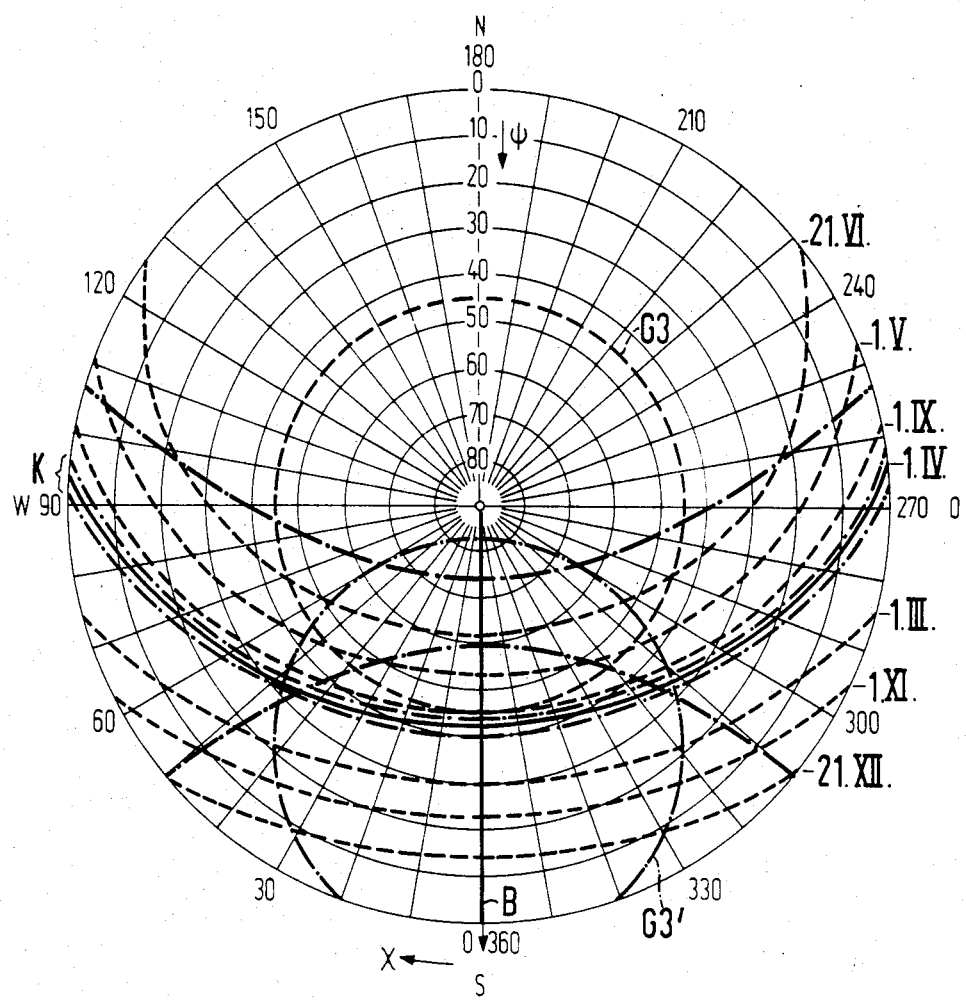
FIG. 1 is the sunshine-exposure diagram of a horizontal surface.

The sunshine-exposure diagram of FIG. 1 illustrates the dependency of the altitude angle $\psi$ (i.e. of the angle of incidence of the sun's rays relative to a horizontal plane) upon the time of day and time of year. The altitude angles $\psi$ have been represented by concentric circles, while the azimuth angles X have been represented as radii which intersect the circles at right angles, commencing from a reference axis B orientated southwards. On the 1st of April (shown as a solid curve), in an azimuthal plane at right angles to the plane of the drawing where the azimuth angle X is 290°, for example, the sun's rays have an altitude angle $\psi$ of about 20°.

Using the same coordinates, it is now possible to construct a screening diagram, as shown in FIG. 5, representing the screening zone for an arbitrarily orientated sunlight protection device; this screening zone is shown cross-hatched in FIG. 5, for the case of prisms running at right angles to the north-south direction. The screening zone indicates up to what values of the azimuth and altitude angles (relative to a horizontal base surface), incident light rays are reflected outwardly by the protection device. Light incident outside the screening zone is admitted into the room which is to be protected against sunlight but which is nevertheless required to be illuminated as well as possible with daylight.

The invention is based on the realization that the transmittancy of a solar protection device to daylight is better, the smaller the area of the screening zone. Under ideal circumstances, the screening zone would only need to be a very narrow corridor K along the center of which is located the sun's path on a particular day (see the sun's path on the 1st of April in FIG. 1). This would ensure a complete screening of the sunlight during the entire day with substantially unobstructed admission of daylight.

By way of comparison, FIGS. 1 and 5 show the screening zone of known slats having individual prisms of pyramidal shape; this zone is circular and defined by the boundary curve G3 shown in broken lines in FIG. 5. In the diagram of FIG. 1, the center of this screening zone can be moved downwardly by inclining the slat to the north-south axis (boundary curve G3' shown by a dash-dotted line) so that protection against sunlight is provided during the entire year, and when appropriately adjusted also throughout the day. At the same time, however, it can be seen that the large area of the screening lies in the region of the main working period of the day when reduced transmission of daylight is particularly disturbing. Here, it should be noted that the circular formation of the screening zone does not have the remotest resemblance to the ideal "annular formation" of the screening corridor K.

The invention is also based on the further recognition that the shape of the screening zone of the slats shown in FIGS. 2 to 4 represents a practicable approximation of the previously mentioned ideal screening corridor, as can be readily seen by comparing FIGS. 1 and 5; in particular, the upper boundary curve G2 of the screening zone is practically identical to the curves of the sun's path of the sunshine exposure diagram. Here again, by inclining the slats (the angle of inclination $\beta$ in FIG. 2 to the horizontal $\neq 0$), the screening zone can be moved downwards to such an extent that it covers as large as possible an area of the curves of the sun's path in the sunshine exposure diagram. The boundaries of a screening zone which has been displaced in this way are represented by a dash-dotted line in FIG. 1. The required screening conditions are therefore fulfilled during several days, without the need for any adjustment during the day. Only around the time of the summer solstice is solar radiation admitted quite early and immediately prior to sunset. Therefore, only four adjustments of the angle of inclination $\beta$ of the slats are needed to cover the entire range of the change in the altitude angle in accordance with the time of year, (in meridian plane 47°) with a screening range of 12° in the same plane. Neither is any elaborate control required for this purpose, since the admission of sunlight will result in prompt manual adjustment.

These favorable screening characteristics are now additionally coupled with optimum light transmittancy measured in comparison with the prior art: during the main working hours of the day, the screening zone provided by the device of the invention and illustrated in FIG. 5 is extremely narrow and thus obstructs the admission of light, in particular the bright high-angle light, to only a slight extent. These excellent results are achieved with a surprisingly simple technique; in the window opening F which is illustrated in FIG. 2 and in this case is sloped, a plurality of slats 1 are arranged so as to be respectively rotatable about parallel, horizontal longitudinal axes L. The slats consist of a light-permeable, refracting material. At their outer faces, they have a flat base surface 11 and on their inner faces, they are formed by a plurality of prismatic rods 10 which are defined by side faces 12 and 13, which are preferably equal in length and which enclose an apical angle of $\alpha$ of 90° (FIG. 3). These prismatic rods 10 which run parallel to the longitudinal axes L do not possess reflective surfaces, and thus work only by total reflection.

The correlation of the coordinates used in FIGS. 1 and 5 with these slats and prismatic rods can be seen from FIG. 4; here a slat is represented by a single prismatic rod 10 which is intersected by a vertical azimuth plane A which encloses an azimuth angle X with a reference plane B. The reference plane B runs at right angles to the longitudinal axis and parallel to the base surfaces 11 of the prismatic rod 10. The altitude angle of a solar ray in the azimuthal plane A relative to the reference surface 11 of the prismatic rod (assumed to be horizontal) has been designated $\psi$.

The screening diagram shown in FIG. 5 applies to the postulated arrangement of FIG. 4 of a prismatic rod with a horizontal base surface 11 and a southwards directed reference axis B. Thus, the screening diagram applies to an inclination angle $\beta$ of 0° in FIG. 2. As already stated, in the case of an angle of inclination $\beta$ deviating from zero, the screening zone moves in parallel fashion downwards.

The form and position of the screening zone in FIG. 5 relate only to an alignment of the slats transverse to the north-south direction. However, in the event of a different alignment of the window openings and slats, basically the same considerations and statements apply: here again it is possible to calculate the boundary curves which define the screening zone but which are then somewhat distorted. The same also then applies to the solar path curves in the sunlight exposure diagram of FIG. 1.

A further advantage of the solar protection device of the invention consists in that the slats can be adjusted in such manner (for example, during the transition time) that solar rays are deliberately directed into the room for heating purposes.

Although various minor changes and modifications might be proposed by those skilled in the art, it will be understood that I wish to include within the claims of the patent warranted hereon all such changes and modifications as reasonably come within my contribution to the art.

I claim as my invention:

1. A solar protection device, comprising: screening means for screening out for a substantial portion of a day direct solar rays from the sun in a narrow screening zone of solar ray angular incidence while simultaneously admitting ambient daylight, said screening means comprising a plurality of slats made of light-permeable material and having a flat non-reflective base surface on a first side facing the sun and a prismatic structure on a second side facing away from the sun; said slats being arranged in side-by-side relationship in a window opening so as to be rotatable about respective parallel longitudinal axes; and the prismatic structure comprising at least one prismatic rod of triangular cross-section with two outside non-reflective planar faces, a longitudinal axis of the rod running parallel to the longitudinal axis of the slat and said two side faces enclosing between them an apical angle of 90°.

2. A device as claimed in claim 1 wherein each slat comprises a plurality of said prismatic rods opposite the base surface, the outside faces of which adjoin one another at a base of the prismatic structure without gaps.

3. A device as claimed in claim 1 wherein the slats are mechanically coupled to one another for simultaneous movement of all slats and such that the base surfaces of all slats face the solar rays at the same angle.

4. A solar protection device according to claim 3 wherein longitudinal axes of the slats are rotatable and are coupled to one another.

5. A window opening solar protection device, comprising: screening means for screening out for a substantial portion of a day direct solar rays from the sun in a narrow screening zone of solar ray angular incidence while simultaneously admitting ambient daylight, said screening means comprising a plurality of slats made of light-permeable material and having a flat base surface on a first side facing the sun and a prismatic structure on a second side facing away from the sun; said slats being arranged in side-by-side relationship in a window opening so as to be rotatable about respective parallel longitudinal axes; and the prismatic structure of said other side of the slats comprising a plurality of triangular cross-section prismatic rods with two exterior planar non-reflective side faces, a longitudinal axis of the rods running parallel to the longitudinal axis of the slat and said two side faces defining an enclosed angle at an apex defined by the two side faces of 90°; and means for orienting all slat base surfaces in a common direction facing the sun.

* * * * *